June 16, 1964 G. L. CLAPPER 3,137,818
SIGNAL GENERATOR WITH EXTERNAL START PULSE PHASE CONTROL
Filed Dec. 27, 1961
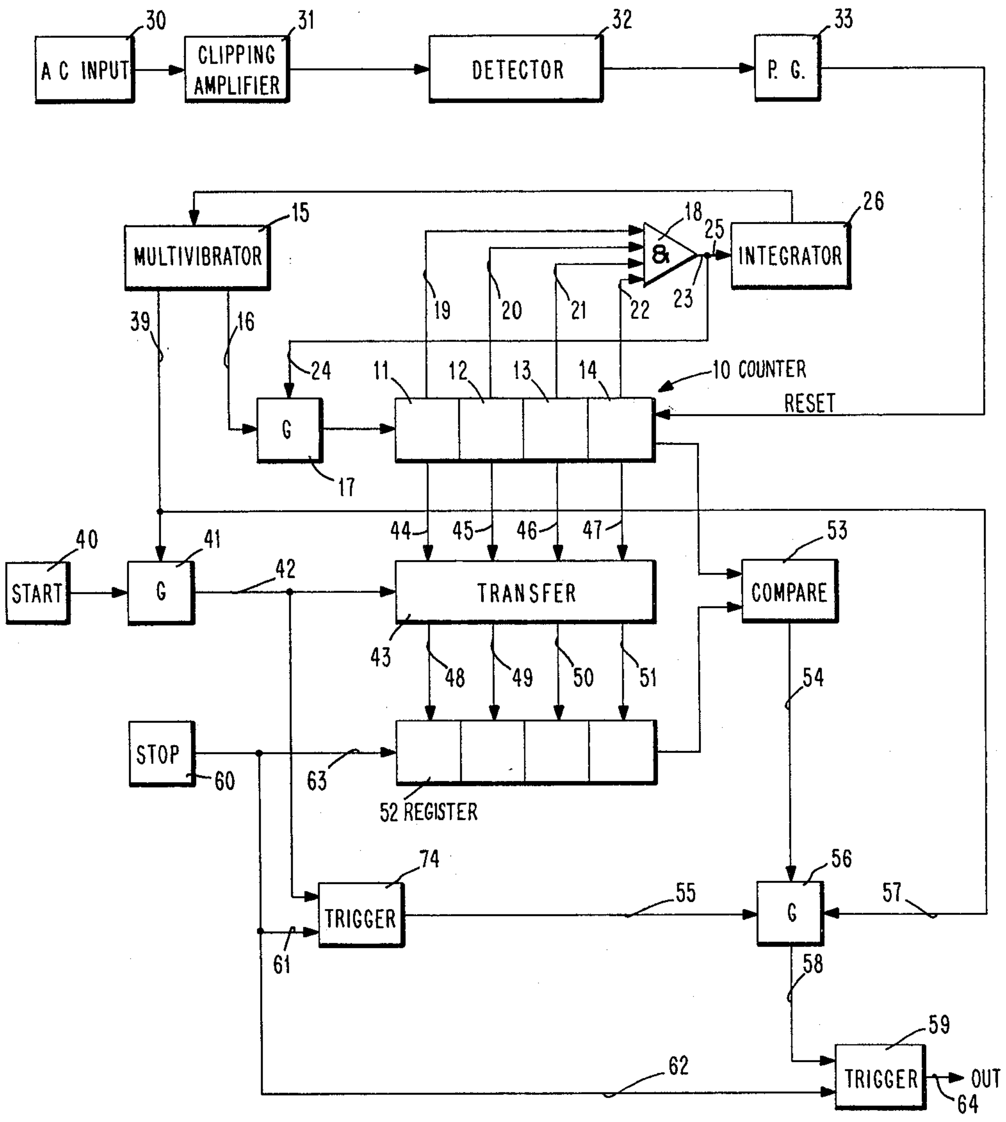
INVENTOR
GENUNG L. CLAPPER
BY John C Black
ATTORNEY United States Patent Office 3,137,818

Patented June 16, 1964

3,137,818

SIGNAL GENERATOR WITH EXTERNAL START PULSE PHASE CONTROL

Genung L. Clapper, Vestal, N.Y., assignor to International Business Machines Corporation, New York, N.Y., a corporation of New York Filed Dec. 27, 1961, Ser. No. 162,443
5 Claims. (Cl. 328—55)

This application relates to an improved phase shifting circuit.

It is frequently desirable for example in data processing apparatus that a source of pulses have a fixed and relatively accurate phase relationship with a predetermined timing interval or source of synchronizing pulses. The design of a reliable circuit which will very accurately assure the desired phase relationship presents difficult problems which are not easily obviated.

Accordingly, it is a primary object of the present invention to provide an improved, input-signal responsive circuit producing output signals having a desired phase relationship with a predetermined timing condition independent of the input signals.

It is another object of the present invention to provide a circuit of the type described in the preceding object in which the phase angle of the output signal is fixed by the initiation of a start signal and is maintained until the application of a stop or completion signal.

It is another object of the present invention to provide a phase shifting circuit in which output pulses are produced at a frequency corresponding to the frequency of input signals and in which the output pulses are produced only in response to and synchronized with input start pulses.

It is another object of the present invention to provide a synchronous phase shifting circuit, in which the accuracy of the phase shifting may be set to any desired value.

It is another object of the present invention to provide a synchronous phase shifting circuit of the type described in the preceding objects in which the input signal frequency may vary over a relatively wide range and in which the frequency of the output signals will correspond to the input signal frequency.

Briefly, the above objects are achieved in a preferred embodiment of the invention by providing means for dividing each half cycle of an alternating current input signal into a plurality of equal increments and means responsive to a start, or phase determining, signal for producing output signals synchronized with the start signal under the control of the input signal increments. In the preferred form, a multivibrator produces output signals which energizes a binary counter until its full count condition is reached, and means responsive to the input signals reset the counter to its zero condition each time the input signals reach their zero voltage crossing point. Means controlled in accordance with the time interval during which the counter remains in its full count condition before resetting to zero, act upon the multivibrator to adjust its frequency so that it is an exact multiple of the alternating current input frequency. This multiple corresponds to twice the number of binary values which can be stored in the counter, whereby the synchronization of the multivibrator with the input signal will result in the counter being cyclically advanced to its full count condition and reset to zero in equal time increments.

In this manner, the phase angle of each half cycle of the input signal is subdivided into equal increments corresponding in number to the capacity of the counter. Thus in a four-denomination binary counter, the 180° phase angle of the input signal will be subdivided into 16 periods which is an angular division of 3.1% of the total 360° cycle, binary values in the counter representing respective input signal increments.

A start pulse applied to the apparatus initiates the transfer of the momentary binary value of the counter into a register. A comparing circuit connected to the counter and to the register produces an output pulse at this time and at each succeeding time that the momentary binary value is again stored in the counter. A bistable trigger is turned ON by the first output pulse from the comparing circuit, and each succeeding output pulse from the comparing circuit switches the trigger to its opposite state.

Thus the trigger produces a train of output pulses which has the same frequency as the input signals and which has a phase relationship determined by the start signal. The train of pulses from the trigger continues until a stop signal is applied to reset the register and to turn OFF the trigger.

A subsequent start signal will initiate another train of output pulses synchronized with this particular start pulse.

The foregoing and other objects, features and advantages of the invention will be apparent from the following more particular description of a preferred embodiment of the invention, as illustrated in the accompanying drawing.

In the drawing:

The single figure is a diagrammatic representation of a preferred form of the improved synchronous phase shifter.

The improved phase shifting circuit includes a conventional binary counter 10 which by way of example includes four cascaded bistable stages 11–14 for accumulating a four-denominational full count. Thus the stages 11, 12, 13 and 14 have weighted values of 1, 2, 4 and 8, respectively. A source of pulses 15 is shown by way of example as a conventional multivibrator, one output 16 of the mutlivibrator being connected to the input of the counter by way of a gating circuit 17. An AND circuit 18 has its inputs 19–22 connected to the "1" sides of the stages 11–14 of the counter. The output 23 of the AND circuit is connected to the input 24 of the gate 17 and to the input 25 of an integrater circuit 26.

When the counter is in its full count condition, that is, when the binary value "1" is stored in each of the stages 11–14, the AND circuit will produce an output signal which is applied to both the integrator 26 and the gating circuit 17. As long as this pulse is applied to the gating circuit, it prevents the application of multivibrator output pulses to the counter, whereby the counter remains in the full count condition. The integrator 26, which controls the frequency of operation of the multivibrator 15 will be described in detail below.

A source of alternating current signals 30 is connected to the counter 10 by way of a clipping amplifier 31, a detector 32 and a pulse generator 33. The source 30 applies an alternating current input to the clipping amplifier 31 wherein the alternating half cycles of the input are changed to substantially square-wave form. The detector, which may be of any well known type or of the type shown in copending U.S. application of G. L. Clapper, Serial No. 161,182, filed December 21, 1961, produces narrow, sharply peaked pulses at each zero voltage crossing point of the square waves. The pulse generator 33 produces a reset pulse of short time duration for each output signal of the transient detector. Each output pulse from the pulse generator 33 resets the counter in a well known manner to its zero count condition.

A start signal source 40 is connected to a gating circuit 41. A second output 39 of the multivibrator 15 is connected to the gating circuit 41. The output 42 of the gating circuit is connected to a conventional transfer circuit 43 and to a trigger 74. Each denominational section of the counter 10 is connected to the inputs 44 to 47 of the transfer circuit and the outputs 48 to 51 of the transfer circuit are connected to a four-position register 52.

The counter 10 and the register 52 are connected to a conventional binary comparison circuit 53 which compares the counts in the counter and the register to produce a pulse at its output 54 each time that the counter assumes a count condition which corresponds to the count in the register.

The output of the trigger 74 is connected to one input 55 of a gating circuit 56. The gating circuit has a second input connected to the output 54 of the comparison circuit and a third input 57 connected to the output 39 of the multivibrator 15. The output 58 of the gating circuit 56 is applied to a bistable trigger 59. The trigger 59 is initially in its OFF condition and a first impulse from the output 58 of the gating circuit 56 turns the trigger ON and succeeding pulses at the output 58 switch the trigger alternately OFF and ON. A stop pulse source 60 is connected to the reset input 61 of the trigger 74, to the reset input 62 of the trigger 59 and to the reset input 63 of the register 52.

The operation of the circuit shown in the drawing will now be described in detail. When the circuit is first energized, the multivibrator will begin to oscillate at its normal frequency and output pulses from the multivibrator will be applied to the binary counter 10 by way of the gating circuit 17. The counter will begin to count succeeding pulses of the multivibrator; and, when the counter reaches the full count of 15, each of the inputs 19–22 of the AND circuit 18 will have potentials applied thereto, whereby a signal is produced at the output 23. This output signal is applied to the gating circuit 17 to prevent the application of multivibrator output pulses to the counter until the counter is reset to zero. The output signal of the AND circuit is also applied to the integrator circuit 26.

The integrator 26 may be of any type known in the art, for example a Miller integrator, which generates a control voltage at its output, the amplitude of which voltage varies as an inverse function of the time integral of the input to the integrator circuit from the AND circuit 18. This output or control voltage of the integrator is the voltage supply for the multivibrator; and, as is well known in the art, the amplitude of the supply voltage controls the operating frequency of the multivibrator 15. Thus the output of the integrator circuit serves to control the width of the output pulses from the multivibrator so that a predetermined number of pulses can be produced in a given time interval. The time interval which is critical here is each half cycle of the alternating current input 30.

As described above, the counter achieves its full count condition during counting of output pulses from the multivibrator and holds said full count until it is reset by each half cycle of the alternating current input. Thus the relative frequencies of the multivibrator and the alternating current input will determine the relative period of time during which the AND circuit 18 will produce an output pulse.

Assume first that the multivibrator is running slower than it should, that is, less than 32 times the frequency of the alternating current input. With this condition existing, the multivibrator will not be able to produce 15 output pulses to set the counter 10 in its full count condition before the succeeding half cycles of the alternating input reset the counter to zero. As a result the AND circuit 18 will not be turned on and the integrator circuit will cause the highest possible voltage to be applied to the multivibrator whereby the multivibrator will begin to increase in frequency.

The multivibrator frequency increases to set the counter in its full count condition before being reset to zero. An output signal from the AND circuit causes the integrator to lower the multivibrator frequency. After a few cycles of the alternating current input, the multivibrator operation will stabilize at a frequency which is 32 times the frequency of the alternating current input thereby to cause a full count to be entered into the counter 10 during the last 15 of the 16 equal phase increments of the alternating current input half cycles. It will be noted that each sixteenth output pulse of the multivibrator will not be introduced into the counter because the AND circuit will apply an inhibit pulse to the input 24 of the gating circuit 17 when the counter is in the full count condition. The reset pulse is applied to the counter during the first phase increment of the alternating current input signal.

Assume the other condition in which initially the multivibrator is running substantially faster than it should, that is, more than 32 times the frequency of the alternating current input. The first 15 pulses from the multivibrator circuit will set the counter 10 to its full count condition to turn on the AND circuit 18. The AND circuit 18 will cause the integrator 26 to supply a lower output voltage to the multivibrator 15, thereby reducing the multivibrator operating frequency. The amount that the integrator output voltage is decreased is dependent upon the length of time between the counter achieving its full count condition and the receipt of the succeeding reset pulse. After a few cycles of alternating current input, the multivibrator will stabilize at the desired operating frequency.

It will also be noted that the frequency of the alternating current input may be variable, for example, from 60 to 120 cycles per second. Since the frequency of the alternating current input determines the frequency of resetting of the counter, the integrator 26 will, as described above, set the multivibrator to the desired frequency which is a multiple, e.g. 32, of the alternating current input frequency. Again a stable state is reached after only a few cycles.

A somewhat similar arrangement for setting an oscillator frequency by means of an integrator circuit is shown and described in U.S. Patent No. 2,819,413, issued January 7, 1958, to G. L. Clapper. In the patent, however, the amplitude of an integrator output voltage is made to vary as a direct function of the time integral of an AND circuit input to the integrator by interposing an inverter stage between the AND circuit output and the integrator circuit input.

When a start pulse from the source 40 is applied to the gating circuit 41, the counter may be in any one of its 16 count conditions, 0 to 15. The next succeeding multivibrator pulse at output 39 is applied to the gating circuit 41 to cause a pulse at output 42 to be applied to the transfer circuit 43. This will cause the count condition in the counter 10 to be transferred to the register 52. Since the register and the counter are now in the same count condition, the comparison circuit 53 will produce an output pulse at 54.

The output pulse from the gating circuit 41 also turns the trigger 74 ON whereby an output signal is applied to the input 55 of the gating circuit 56. The multivibrator output pulse which turned on the gating circuit 41 is also applied to the third input 57 of the gating circuit 56.

With signals applied to the three inputs to the gating circuit 56, the gating circuit 56 produces an output pulse at 58 to turn the trigger 59 ON and the trigger will produce a pulse at its output 64 which is the first half cycle of the desired output signal.

It is noted that the multivibrator 15 applies pulses sequentially to its two outputs 16 and 39. The pulses appearing at output 16 advance the counter, and the pulses at output 39 initiate transfer of the count to the register 52 and gate pulses from the comparison circuit 53 to the trigger 59. This assures a stable counter state when a transfer of the count is performed and when count comparison is made.

It will be apparent from the description above that the turning ON of the trigger 59 and therefore the output pulse from the trigger is related in time to the phase of the start signal applied to the terminal 40. In order to provide the output pulse at 64, it was necessary that coincidence of the start signal and the next succeeding multivibrator output signal occur. A very slight time delay occurring in the transfer of the count from the counter 10 to the register 52 and in the recognition of the similar count by the comparison circuit is unavoidable but these can be held to a minimum by utilizing high speed switching circuits of known types. The maximum difference in phase between the output pulse 64 and the start pulse at terminal 40 is determined by the number phase increments into which the input signal is divided. In the embodiment shown, the 180° phase angle of each half cycle of the alternating current input is subdivided into 16 periods of 11.25° each. This angular division, 3.1% of the total 360° cycle, is the maximum phase difference which can occur between the start pulse and the output pulse. If a higher degree of precision is desired, the counter is expanded to count a larger number, for example, 256. The precision is now 16 times better or about .2%. It will be appreciated that, if the counter is expanded to count 256, the frequency of operation of the multivibrator is increased accordingly, that is, 16 times the frequency of the embodiment shown.

It is noted that the 3.1% precision resulting from the simple four-stage counter of the example shown is better than existing pulse delay methods for phase shifting and these existing pulse delay methods are not instantaneously adjustable.

Returning now to the operation of the circuit shown in the drawing, it will be recalled that the start pulse resulted in the initiation of an output pulse at 64. Assume by way of example that the count in the counter 10 was six at the time of the transfer of the count to the register 52. The counter will continue to count succeeding pulses from the multivibrator until the full count of fifteen is achieved. A reset signal will be applied to the counter 10 to reset it to zero. The counter will again start counting pulses from the multivibrator output 16 until a count of six is obtained. The comparison circuit 53 will again produce an output pulse at 54; and when the next multivibrator pulse at output 39 is applied to the gating circuit input 57, the gating circuit 56 will apply another pulse to the trigger 59 to turn the trigger OFF thereby to produce the second half cycle of the output signal at 64.

Succeeding counts of six in the counter 10 will sequentially turn the trigger 59 ON and OFF to produce output pulses at the frequency of the alternating current input 30, and each output pulse at 64 has a definite phase relationship with the start signal input 40.

The train of pulses at output 64 will continue until a stop pulse is produced at source 60. This stop pulse will reset triggers 74 and 59 to their OFF states and the register 52 to its zero count condition.

With the trigger 74 OFF, the gating circuit 56 will prevent the application of comparison circuit output pulses to the trigger 59 until a succeeding start pulse is produced at source 40. A train of pulses produced in the manner described above in response to this second start signal will be substantially in phase with the second start signal and is completely independent of the phase of the first mentioned start signal.

Thus it can be seen that the improved circuit of the present application is particularly advantageous in that output pulses are produced at a desired frequency instantaneously adjustable to a predetermined phase relationship with respect to a start signal.

It will be appreciated that the source 30 may produce any regularly recurring type of pulsating signal and also that suitable well known means may be used to reset the counter during any predetermined incremental portion of the signal other than a zero voltage crossing point. It is also within the scope of the invention as defined by the appended claims to provide an output signal, the frequency of which is a multiple or submultiple of the input frequency. For example, if well known bistable trigger means permit only alternate output pulses of the pulse generator 33 to reset the counter to zero, the frequency of the output signals at 64 will be half the frequency of the input signal. It is well within the skill of those experienced in the art to provide four equally spaced reset pulses for each cycle of input signal to double the output frequency.

The term "multivibrator" as used in the appended claims is intended to be used in a broad sense to include any suitable means which produces a cyclically recurring train of pulses, the frequency of which is controllable.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an electrical circuit adapted to receive cyclically varying input signals, the combination comprising a counter having zero, intermediate and full count conditions, a multivibrator connected to the counter to advance the latter, means preventing advancing of the counter by the multivibrator when the counter is in its full count condition, means responsive to the input signals for resetting the counter to its zero count condition at a predetermined phase increment of each half cycle of the input signals, means including the counter setting the multivibrator frequency at a multiple of the input frequency corresponding to twice the number of count conditions, a register, means rendered effective at a predetermined time for setting the register in accordance with the count existing in the counter, a comparing circuit producing output pulses each time that the counts in the counter and register are equal, and a bistable device switched from one state to the other incident to succeeding output pulses from the comparing circuit.

2. In an electrical circuit adapted to receive cyclically varying input signals susceptible to variations in frequency, the combination comprising a counter having zero, intermediate and full count conditions, a multivibrator connected to the counter to advance the latter, means preventing advancing of the counter by the multivibrator when the counter is in its full count condition, means responsive to the input signals for resetting the counter to its zero count condition at a predetermined phase increment of each half cycle of the input signals, means including the counter setting the multivibrator frequency at a multiple of the input frequency corresponding to twice the number of count conditions, a register, means rendered effective at a predetermined time for setting the register in accordance with the count existing in the counter, a comparing circuit producing output pulses each time that the counts in the counter and register are equal, and a bistable device switched from one state to the other incident to succeeding output pulses from the comparing circuit.

3. In an electrical circuit adapted to receive cyclically varying input signals, the combination comprising a multistage counter having zero, intermediate and full count conditions, a multivibrator connected to the counter to advance the latter, means including a gating circuit connected between the counter and multivibrator and an AND circuit connected between the counter stages and the gating circuit preventing advancing of the counter by the multivibrator when the counter is in its full count condition, means responsive to the input signals for resetting the counter to its zero count condition at a predetermined phase increment of each half cycle of the input signals, an integrator circuit connected between the AND circuit and the multivibrator setting the multivibrator frequency at a multiple of the input frequency corresponding to twice the number of count conditions, a register, means rendered effective at a predetermined time for setting the register in accordance with the count existing in the counter, a comparing circuit producing output pulses each time that the counts in the counter and register are equal, and a bistable device switched from one state to the other incident to succeeding output pulses from the comparing circuit.

4. In an electrical circuit adapted to receive cyclically varying input signals, the combination comprising a counter having zero, intermediate and full count conditions, a multivibrator having a pair of alternatively energized outputs, one of the outputs being connected to the counter to advance the latter, means preventing advancing of the counter by the multivibrator when the counter is in its full count condition, means responsive to the input signals for resetting the counter to its zero count condition at a predetermined phase increment of each half cycle of the input signals, means including the counter setting the multivibrator frequency at a multiple of the input frequency corresponding to twice the number of count conditions, means for receiving a start pulse, a register, means rendered effective upon coincidence of the energization of the other multivibrator output and the start pulse for setting the register in accordance with the count existing in the counter, a comparing circuit producing output pulses each time that the counts in the counter and register are equal, a bistable trigger, and gating means rendered effective upon coincidence of the energization of the other multivibrator output and the start pulse switching the trigger from one state to the other incident to succeeding output pulses from the comparing circuit.

5. The combination set forth in claim 4 together with means for receiving a stop pulse, and means responsive to the stop pulse rendering the gating means ineffective.

References Cited in the file of this patent

UNITED STATES PATENTS

| | | |
|---|---|---|
| Re. 24,240 | Canfora | Nov. 27, 1956 |
| 2,848,628 | Altschul | Aug. 19, 1958 |